US007689861B1

(12) United States Patent
Wang et al.

(10) Patent No.: US 7,689,861 B1
(45) Date of Patent: *Mar. 30, 2010

(54) DATA PROCESSING RECOVERY SYSTEM AND METHOD SPANNING MULTIPLE OPERATING SYSTEM

(75) Inventors: Frank C. Wang, Boca Raton, FL (US); Donald Messerli, Bay Harbor Islands, FL (US); Dennis E. Kelly, Boca Raton, FL (US)

(73) Assignee: XPoint Technologies, Inc., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/286,202

(22) Filed: Sep. 29, 2008

Related U.S. Application Data

(62) Division of application No. 11/396,894, filed on Apr. 3, 2006, now Pat. No. 7,430,686, which is a division of application No. 10/267,492, filed on Oct. 9, 2002, now Pat. No. 7,024,581.

(51) Int. Cl.
*G06F 11/00* (2006.01)
(52) U.S. Cl. .............................................. 714/6; 714/2
(58) Field of Classification Search ...................... 714/2, 714/5, 6, 15, 38, 48; 711/161, 162, 173; 713/2; 709/224; 717/168, 170, 174
See application file for complete search history.

(56) References Cited

U.S. PATENT DOCUMENTS

| 5,379,342 A | 1/1995 | Arnold et al. ................... 713/2 |
| 5,675,769 A | 10/1997 | Ruff et al. ..................... 711/173 |
| 5,708,776 A | 1/1998 | Kikinis |
| 5,778,395 A | 7/1998 | Whiting et al. ............. 707/204 |
| 5,860,124 A | 1/1999 | Matthews et al. ........... 711/165 |
| 5,907,672 A | 5/1999 | Matze et al. ..................... 714/8 |
| 6,061,770 A | 5/2000 | Franklin ...................... 711/162 |
| 6,144,992 A | 11/2000 | Turpin et al. ................ 709/208 |
| 6,167,494 A | 12/2000 | Cheston et al. |
| 6,195,695 B1* | 2/2001 | Cheston et al. ............. 709/221 |
| 6,230,285 B1* | 5/2001 | Sadowsky et al. ............. 714/14 |
| 6,253,300 B1 | 6/2001 | Lawrence et al. ........... 711/173 |
| 6,281,894 B1 | 8/2001 | Rive |
| 6,374,266 B1 | 4/2002 | Shnelvar ..................... 707/204 |
| 6,374,363 B1 | 4/2002 | Wu et al. ....................... 714/6 |

(Continued)

OTHER PUBLICATIONS

Acronis, Acronis OS Selector 5.0 User Guide, copyright 2002 (178 pages).

(Continued)

*Primary Examiner*—Dieu-Minh Le

(57) ABSTRACT

A system and method for recovering from a computer system crashing as a result of the storage disk suffering physical damage and/or the corruption of an application, operating system, and/or data. The computer system may be standalone or a part of a communication network. The computer includes a hard disk storage divided into a primary partition containing a unique operating system for executing application programs and a recovery partition containing a unique operating system for executing application programs and for backup data storage. A boot track storing a boot manager, a backup status information file for establishing communication between the operating systems of the primary and recovery partitions, and a status validation file verifying the integrity of the backup status information file.

26 Claims, 11 Drawing Sheets

U.S. PATENT DOCUMENTS

| | | | |
|---|---|---|---|
| 6,378,054 B1 | 4/2002 | Karasudani et al. | 711/161 |
| 6,392,984 B2 | 5/2002 | Mori et al. | 369/275.3 |
| 6,430,663 B1 * | 8/2002 | Ding | 711/162 |
| 6,438,749 B1 | 8/2002 | Chamberlain | 717/174 |
| 6,460,054 B1 | 10/2002 | Grummon | 707/204 |
| 6,519,762 B1 | 2/2003 | Colligan et al. | |
| 6,523,103 B2 * | 2/2003 | Page | 711/173 |
| 6,587,970 B1 | 7/2003 | Wang et al. | 714/47 |
| 6,591,376 B1 | 7/2003 | VanRooven et al. | |
| 6,594,743 B1 | 7/2003 | Chen et al. | 711/162 |
| 6,594,822 B1 | 7/2003 | Schweitz et al. | 717/140 |
| 6,615,365 B1 | 9/2003 | Jenevein et al. | 714/6 |
| 6,629,110 B2 | 9/2003 | Cane et al. | 707/204 |
| 6,647,399 B2 | 11/2003 | Zaremba | 707/204 |
| 6,654,906 B1 | 11/2003 | Arndt | |
| 6,658,435 B1 | 12/2003 | McCall | 707/204 |
| 6,658,591 B1 | 12/2003 | Arndt | |
| 6,671,705 B1 | 12/2003 | Duprey et al. | 707/204 |
| 6,701,356 B1 | 3/2004 | Condict et al. | 709/220 |
| 6,711,660 B1 | 3/2004 | Milne et al. | 711/173 |
| 6,718,466 B1 | 4/2004 | Duwe et al. | |
| 6,728,847 B1 | 4/2004 | Qin et al. | 711/162 |
| 6,748,553 B2 | 6/2004 | McBride et al. | |
| 6,754,855 B1 * | 6/2004 | Denninghoff et al. | 714/48 |
| 6,763,458 B1 | 7/2004 | Watanabe et al. | 713/100 |
| 6,807,630 B2 * | 10/2004 | Lay et al. | 713/2 |
| 6,845,464 B2 * | 1/2005 | Gold | 714/6 |
| 6,851,073 B1 | 2/2005 | Cabrera et al. | |
| 6,859,925 B2 | 2/2005 | Lin | |
| 6,880,101 B2 | 4/2005 | Golasky et al. | |
| 6,901,493 B1 * | 5/2005 | Maffezzoni | 711/162 |
| 6,910,151 B2 | 6/2005 | Qin et al. | 714/6 |
| 6,934,881 B2 | 8/2005 | Gold et al. | |
| 6,948,099 B1 | 9/2005 | Tallam | |
| 6,957,362 B2 | 10/2005 | Armangau | 714/20 |
| 6,963,981 B1 | 11/2005 | Bailey et al. | 726/22 |
| 6,993,642 B2 | 1/2006 | Burkhardt et al. | 713/1 |
| 6,996,706 B1 | 2/2006 | Madden et al. | 713/2 |
| 6,996,828 B1 * | 2/2006 | Kimura et al. | 719/319 |
| 7,032,177 B2 | 4/2006 | Novak et al. | 715/723 |
| 7,096,330 B1 * | 8/2006 | Root et al. | 711/162 |
| 7,146,612 B2 | 12/2006 | Sedlack | 717/178 |
| 7,203,804 B2 | 4/2007 | Kawano et al. | 711/162 |
| 7,254,682 B1 | 8/2007 | Arbon | 711/161 |
| 7,287,249 B2 | 10/2007 | Coyle et al. | 717/168 |
| 7,287,250 B2 | 10/2007 | Liles et al. | 717/174 |
| 7,310,653 B2 | 12/2007 | Coyle et al. | 707/203 |
| 7,409,685 B2 | 8/2008 | Chen et al. | 717/170 |
| 2002/0059498 A1 * | 5/2002 | Ng et al. | 711/112 |
| 2002/0083362 A1 * | 6/2002 | Semo et al. | 714/4 |
| 2003/0012114 A1 * | 1/2003 | Larvoire et al. | 369/100 |
| 2003/0023839 A1 * | 1/2003 | Burkhardt et al. | 713/1 |
| 2006/0085686 A1 | 4/2006 | Cheston et al. | 714/38 |

OTHER PUBLICATIONS

SoftThinks, SoftThinks Provides PC Recovery Software Solution in HP Pavilion Home PCs Worldwide, Nov. 6, 2001, (1 page).

Hewlett-Packard Company, Quick Start Guide, copyright 2002 (114 pages).

Symantic, Symantec Ghost™ Implementation Guide 7.0, copyright 1998-2001 (326 pages).

Microsoft, PressPass "Windows XP to Take the PC to New Heights" Aug. 2001, (3 pages).

Wikipedia, Ghost (software) description, date unknown (8 pages).

Microsoft, Article ID307844 "How to change driver letter assignments in Windows XP", last review Jun. 2005 (4 pages).

Microsoft, Article ID306559 "How to create a multiple-boot system in Windows XP", last review Jul. 2007 (8 pages).

Microsoft, Article ID316941 "How to install or upgrade to Windows XP", last review Oct. 2008 (7 pages).

Microsoft, Article ID313348 "How to partition and format a hard drive by using Windows XP setup program", last review Nov. 2008 (6 pages).

Microsoft, Article ID304449 "How to start the system restore tool . . . ", last review Nov. 2008 (3 pages).

Microsoft, Article ID309000 "How to Disk Management to configure . . . ", last review Jul. 2004 (4 pages).

Microsoft, Article ID320820 "How to use the backup utility . . . ", last review Oct. 2008 (3 pages).

Bobbie Harder, Microsoft Windows XP System Restore, copyright 2009 (bears Apr. 2001 date), (8 pages).

Microsoft, Use Backup to Protect Data, Aug. 2001 (2 pages).

Ed Bott, Windows XP Backup made Easy, Jul. 2003 (4 pages).

Symantec, Norton Ghost™ User's Guide, copyright 1998-2002 (221 pages).

Symantec, Norton Ghost™ User's Guide, copyright 1998-2001 (124 pages).

Microsoft, "How to Set up and Use Automated System Recovery . . . ", Oct. 2001 (3 pages).

* cited by examiner

DATA PROCESSING RECOVERY SYSTEM AND METHOD SPANNING MULTIPLE OPERATING SYSTEM

This patent application is a divisional patent application of prior patent application Ser. No. 11/396,894 filed Apr. 3, 2006 now U.S. Pat. No. 7,430,686 which was a divisional patent application of Ser. No. 10/267,492 filed Oct. 9, 2002 and issued on Apr. 4, 2006 as U.S. Pat. No. 7,024,581.

FIELD OF INVENTION

The present invention related generally to a system and method of recovering from corruption in data in computer disc storage or physical damage thereto. More particularly, the present invention relates to recovery by either of two operating systems installed in different partitions of the storage and utilizing elements in a boot track for establishing communication between the operating systems and backup/restore program segments associated with each operating system.

BACKGROUND OF THE INVENTION

The present invention relates, in general, to the field of managed recovery technology within the computer industry. More particularly, the present invention relates to a system, method, and computer program for backing up and restoring computer data. In addition, the present invention is integral in safeguarding computers from corruptions such as software viruses, user errors, and other catastrophes by storing backup data in a protected storage area. This protected storage area is hidden from the end user and the computer's primary operating system so that backup data remains impervious to the programs and processes performed within the primary partition.

Computers are used for a variety of tasks including performing calculations, sending and receiving electronic mail, accessing the Internet, and more. Integral to the value of a computer is its ability to write data to a storage media and then read, or retrieve, this data at a later point in time. Therefore, the value of a computer system is directly related to the reliability and integrity of this data. With this said, dependable data storage is a crucial aspect of modern computer usage.

For example, a retail store's point of sale computer typically stores a variety of data including operating system files, application files, sales records, customer information, and more. Current data is generally stored in a primary storage media, such as a hard disk, for rapid access. In many organizations, however, computer data is regularly archived (or "backed-up") to an archive media, such as magnetic disks, optical disks, and/or magnetic tapes to preserve the data for historical purposes. This allows a method by which data can be accessed at some point in the future. Preferably, the current data is copied from the computer's primary storage media to the archive media. The archive media is then stored in a safe location, preferably off-site, as a further precaution to protect the archived data.

To reduce the overhead associated with backups, it is common for users to specify a subset of files within their primary partition to include in backups. The files included in backups are usually those that do not exist on another media such as user-created word processing documents, databases, and spreadsheets. Conversely, files that can be retrieved from another media such as an installation CD are often excluded from backups. Examples of files often excluded from backups include those included in installation programs such as operating systems and application files.

As the amount of data residing in the computer system increases, however, the time and computer resources required to archive the data also increases. In addition, since standard backup/restore programs do not perform comparisons to determine which files are new or modified since the last backup, it is common for several backup sets to contain an exact copy of the same file. This decreases the efficiency of the backup process by increasing the time required to complete a backup as well as the amount of media space required to store the resulting backup. While this backup method accomplishes the basic goal of backing up data, it is inefficient, time-consuming, and in most cases, incomplete as it only includes a subset of the data currently stored on the computer. In addition, if a restore is required, the user must reinstall all of the applications and data not included in the backup process. In most cases, this requires the user to reinstall the operating system and applications before restoring their backup data.

Like all standard applications, backup/restore programs require the existence of a functional, compatible operating system. Therefore, in the event that there is a corruption to a computer's operating system, the backup/restore program will not function and users cannot restore their data. The only solution to this problem is for the user to reinstall the computer's operating system and then initiate the restore process. For several environments such as point of sale computers, branch offices, and the mobile workforce, this inefficiency makes the standard backup/restore program a less than desirable solution.

For example, a point of sale computer can be tied into the standard operating procedures of a restaurant. In this scenario, the restaurant uses its computers to process customer orders including displaying the order for the cook, calculating the cost of the meal, calculating the amount of change, and more. Restaurants cannot afford to perform the time-consuming task of restoring a point of sale machine while customers wait to place their orders. In addition, if the computer's operating system is corrupt and will not boot to its primary partition, extensive computer knowledge is required before restoring the system including an understanding of operating systems, drivers, networks, etc. The result is extended downtime resulting in a loss of revenue, productivity, and ultimately profitability.

Accordingly, the prior art systems for backing up and restoring computer data have significant disadvantages and limitations. It would, therefore, be highly desirable to create a backup application that eliminates the problems of the conventional backup process and allows users to rapidly restore their computer to a previously known state.

SUMMARY OF THE INVENTION

The present invention utilizes the computing power of present day in conjunction with data storage medias to increase the reliability, accessibility, flexibility, and performance of backup and restore operations. Through the collaborative use of storage medias and backup/restore software, a high performance backup/restore solution has been provided which, in a particular implementation thereof, resulted in the support of backing up and restoring a computer from its primary partition, recovery partition, or combination thereof. By providing multiple backup and restore points, this invention increases the effectiveness of the backup/restore process.

In the preferred embodiment, the backup/recovery program's architecture consists of a hard disk with a backup/ restore component within the primary partition, a backup/ restore component within the restore partition, and a backup/ restore information file within the boot sector. Since the backup/restore components reside in difference partitions and are controlled by their respective operating system, they are unaware of the existence of the backup/restore component residing in the other partition. The current invention enables these components to communicate with each other via a backup/restore information file within in the boot track to complete complex backup and recovery responsibilities spanning multiple operating systems.

This present invention uses a communication method that stores backup/recovery-specific information in the hard disk's boot sector. Since, by definition, the boot track does not belong to any partition, the present invention uses the backup/ restore information file to pass information between the backup/restore program's primary partition and the recovery partition components. This enables the invention's primary partition and protected partition components to communicate with each other to perform backup and restore processes across multiple partitions. In essence, the backup/restore information file acts as a gateway, passing information between the primary partition's backup/restore program and the recovery partition's backup/restore program. In addition, both components of the backup/restore program can read from and write to the boot sectors backup/recovery-specific information file.

Since the backup/restore information file contains essential information, the integrity of the backup/restore information file is critical to the success of the present invention. To ensure the accuracy of this information, the present invention includes a mechanism by which the backup/restore information file is verified each time it is accessed. This process validates the information within the backup/restore information file has not been modified or corrupted by unauthorized programs or processes. In addition, if the verification process determines the backup/restore information file is corrupt, the present invention takes the appropriate actions to rectify the problem before using the information to perform backup and restore procedures.

In addition, the restore partition cannot be accessed by any application or process other than the backup/recovery program. This ensures the backup data remains unaffected by corruptions or catastrophes occurring within the primary partition. Therefore, in the event of an operating system corruption within the primary partition, the user can still restore. This is possible by booting to the recovery partition and using the backup/restore component contained therein to initiate the recovery of the primary partition. Therefore, computers can be restored regardless of whether they can boot to their primary operating system.

As a result of the present invention consisting of two components, one within the primary partition and another within the recovery partition, the backup/recovery program combines sector-based backups with file-based backups. A sector-based backup is performed by the backup/restore component within the recovery partition and consists of a sector-by-sector copy of the primary partition. Once created, a sector-based backup is compressed and stored in the recovery partition. Similarly, a sector-based restore is performed by the backup/restore component within the recovery partition and consists of sector-by-sector restore of the primary partition. Therefore, in the event the primary partition is inaccessible due to an operating system corruption, the primary partition can be restored. The restore is performed using the recovery partition's backup/restore component to initiate a sector-based restore of the primary partition.

A file-based restore is performed by the backup/restore component within the primary partition and consists of incremental changes between the state of the primary partition at the time of the last backup and the current backup. A file-based backup is performed by the backup/restore component within the primary partition and consists of incremental changes, or modifications, made to the primary partition since the last backup was generated. Once created, a file-based backup is stored in the recovery partition. Similarly, a file-based restore is performed by the backup/restore component within the primary partition and consists of a file-based restore of the primary partition.

Since file-based backups are based on incremental changes to the primary partition, it is possible for a file-based restore to require a sector-based restore prior to the file-based restore to return the primary partition to the exact state at the time of the file-based backup was performed. In this scenario, the restore process spans multiple partitions, operating systems, and backup/restore components using the backup/restore information file within the boot track as a means of communication.

In addition, the backup/restore program allows users to select a single file to restore from a file-based backup. When restoring from a file-based backup, the backup/restore component within the primary partition accesses the file-based backup within the recovery partition and restores only the selected file.

Finally, the present invention supports the storage of multiple backups within the recovery partition so that users can choose to restore from backups representing specific points in time. For example, in the preferred embodiment, the invention stores a single sector-based backup and two cumulative backups. This allows the user to restore from three different historical moments.

As discussed above, splitting the program into two main components, each running under their own operating system within their own partition on a storage media, the present invention ameliorates a number of traditionally encountered problems including, but not limited to, restoring a machine when its primary partition's operating system is corrupted and restoring a single file from a backup. In doing so, the backup/restore information file acts as an information gateway to ensure the completion of complex backup/restore processes across multiple partitions, operating systems, and backup/restore components.

In accordance with these and other objects which will become apparent hereinafter, the instant invention will now be described with particular reference to the accompanying drawings.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTIONS OF PREFERRED EMBODIMENTS

Figure 1:
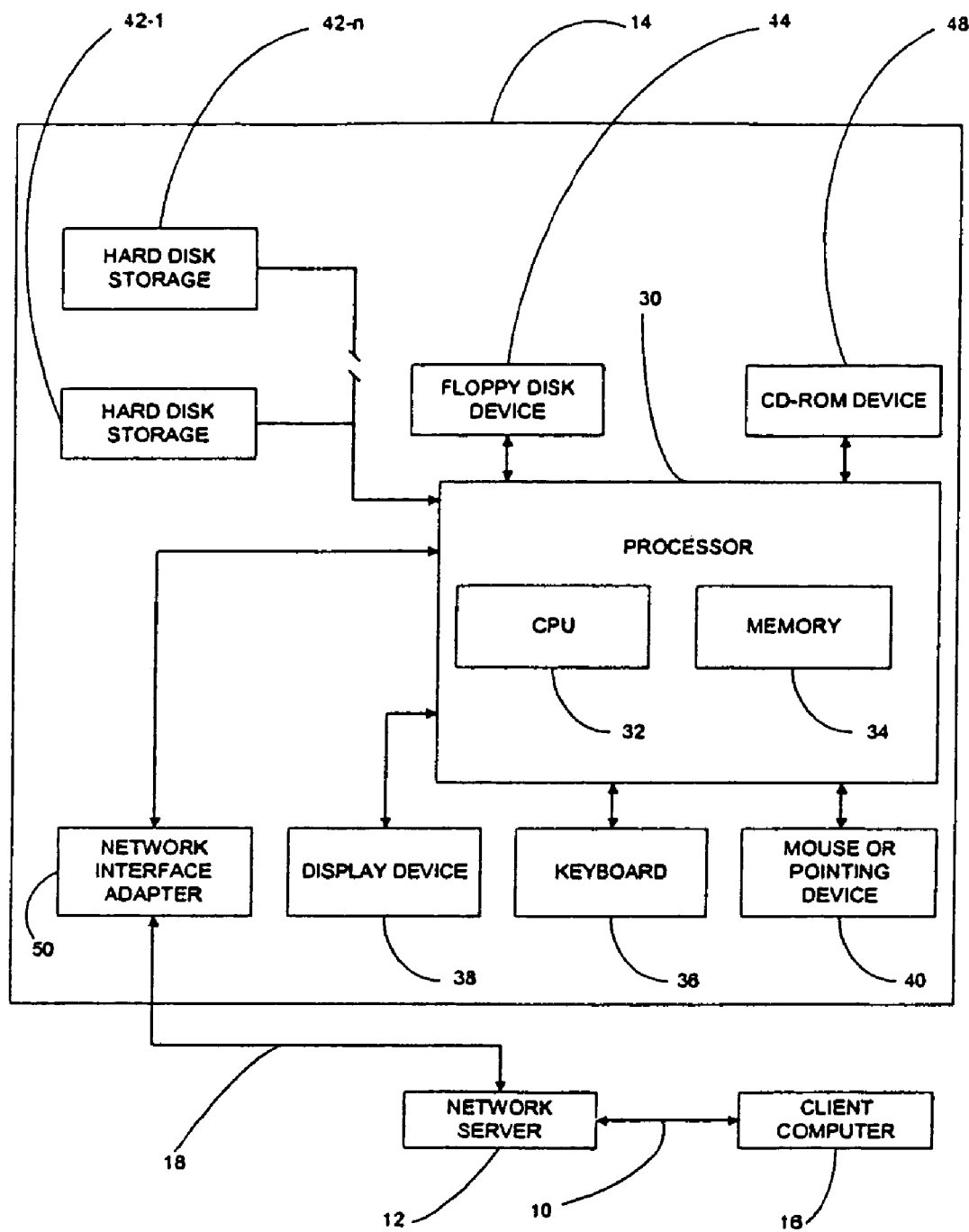
FIG. 1 illustrates a simplified general purpose computer and network for possible use in conjunction with the system and method of the present invention.

A typical, well-known, local area network (LAN) within which the present invention can be used is illustrated diagrammatically in FIG. 1. The LAN includes a network server 12, connected to computers 14 and 16, via network communications paths 18 and 10, respectively.

Each client computer such as 14 is well known in the art and includes a processor 30, having a central processing unit 32, and memory 34. A keyboard 36, a display device 38, and a mouse 40 are coupled to the processor 30, via a natively attached peripheral bus (not shown). One or more hard disk, storage units 42-1 to 42-n, a floppy disk device 44, and a CD-ROM 48 are also coupled to the processor 30 via standard disk channel interfaces (not shown). A network interface adapter 50 is also coupled to the natively attached peripheral bus.

Generally, in contemporary systems, the hard disks 42-1 through 42-n, are capable of reading, writing, and storing data, which typically contains programs and data. Computer program products containing mechanisms to effectuate the apparatus and methods in accordance with the present invention may reside in the memory section 34, or on the hard disks 42-1 through 42-n, of such a system. The present invention is optionally implemented in software devices loaded in memory 34, and/or stored on a configured storage unit 42-1, or other storage device thereby transforming the computer system in FIG. 1 to a special purpose machine for implementing the present invention.

One example of a network in which the present invention can be used is shown in U.S. Pat. No. 5,913,028 issued Jun. 15, 1999 to the assignor herein and said patent is incorporated herein by reference as if fully set forth. Examples of computers in which the present invention can be used include International Business Machines Corporation, Compaq Computer Corporation, and personal computers offered by other manufacturers. In accordance with the present invention, backup software may be executed by the computer and source and destination data may be stored on the hard disk storage units 42-1 through 42-n, or other storage medium units coupled to the system.

Figure 2:
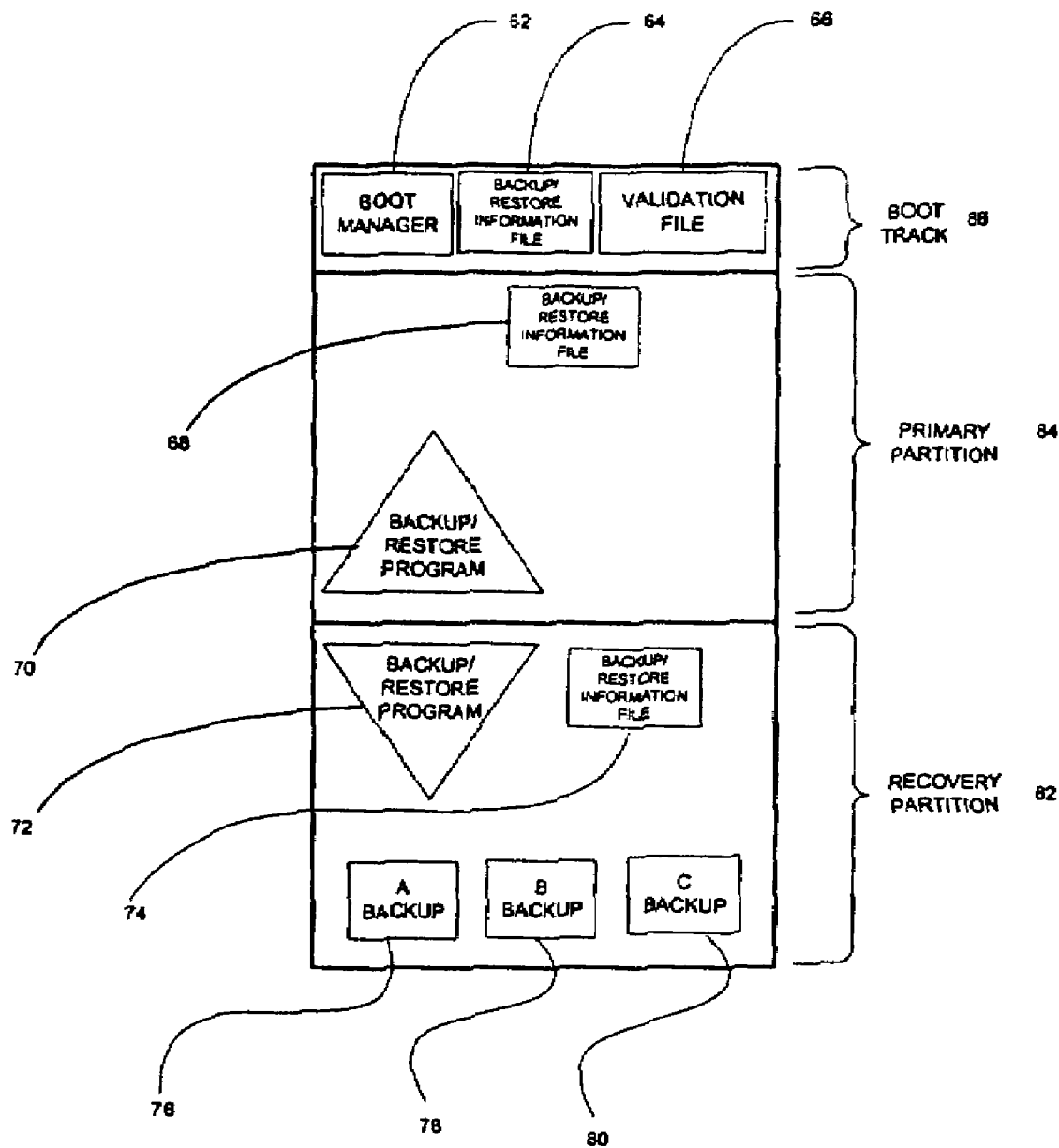
FIG. 2 illustrates a simplified exemplary system embodiment when a single data, storage media is used in accordance with the present invention.

With reference additionally now to FIG. 2, an exemplary system embodiment of a computer with a single hard disk in accordance with the present invention is depicted. In the illustrated embodiment, the hard disk is divided into three unique areas referred to as the boot track 86, primary partition 84, and recovery partition 82. The boot track 86 stores the boot manager 62, backup/restore information file 64, and a backup/restore information validation file 66. In this exemplary system embodiment, the primary partition 84, runs under the Microsoft Windows operating system and contains a backup/restore information file 68 and a backup/restore program 70. The recovery partition 82, runs under the DOS operating system and contains a backup image of the primary partition (A Backup) 76. The sector-based backup image 76 is created from within the recovery partition 82, as discussed in the description accompanying FIG. 9.

In addition, the recovery partition 82 may optionally contain incremental file-based backups that represent the primary partition 84, at specific points in time. The cumulative backups (B Backup) 78, stores file-based information representing the difference between the state of the hard disk at the time of the A Backup 76, and the B Backup 78 (e.g., data that was deleted, added or modified). The B Backup is created from within the primary partition as discussed in the detailed description of FIG. 10.

The most recent backup (C Backup) 80 is an incremental file-based backup file reflecting the state of the primary partition 84, at the time the backup is performed. Only files not matching those in the B Backup 78 are stored in the most recent backup file 80. Therefore, the C Backup 80 only stores incremental information defining the differences between the B Backup 78, and the C Backup 80. In addition, each subsequent most recent backup replaces the previous most recent backup.

Figure 3:
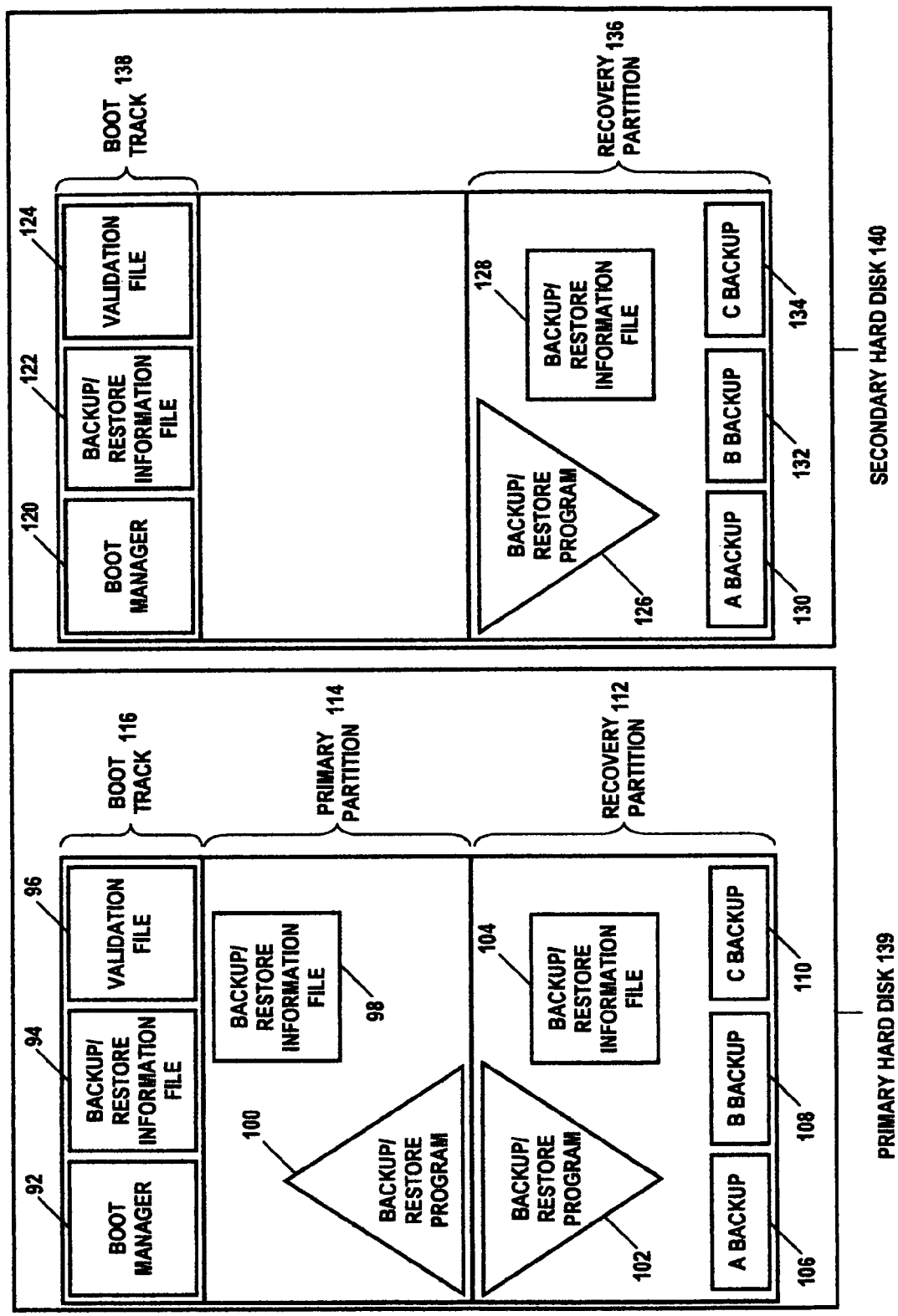
FIG. 3 illustrates a simplified exemplary system embodiment when two data storage medias are used for backup redundancy in accordance with the present invention.
Figure 4:
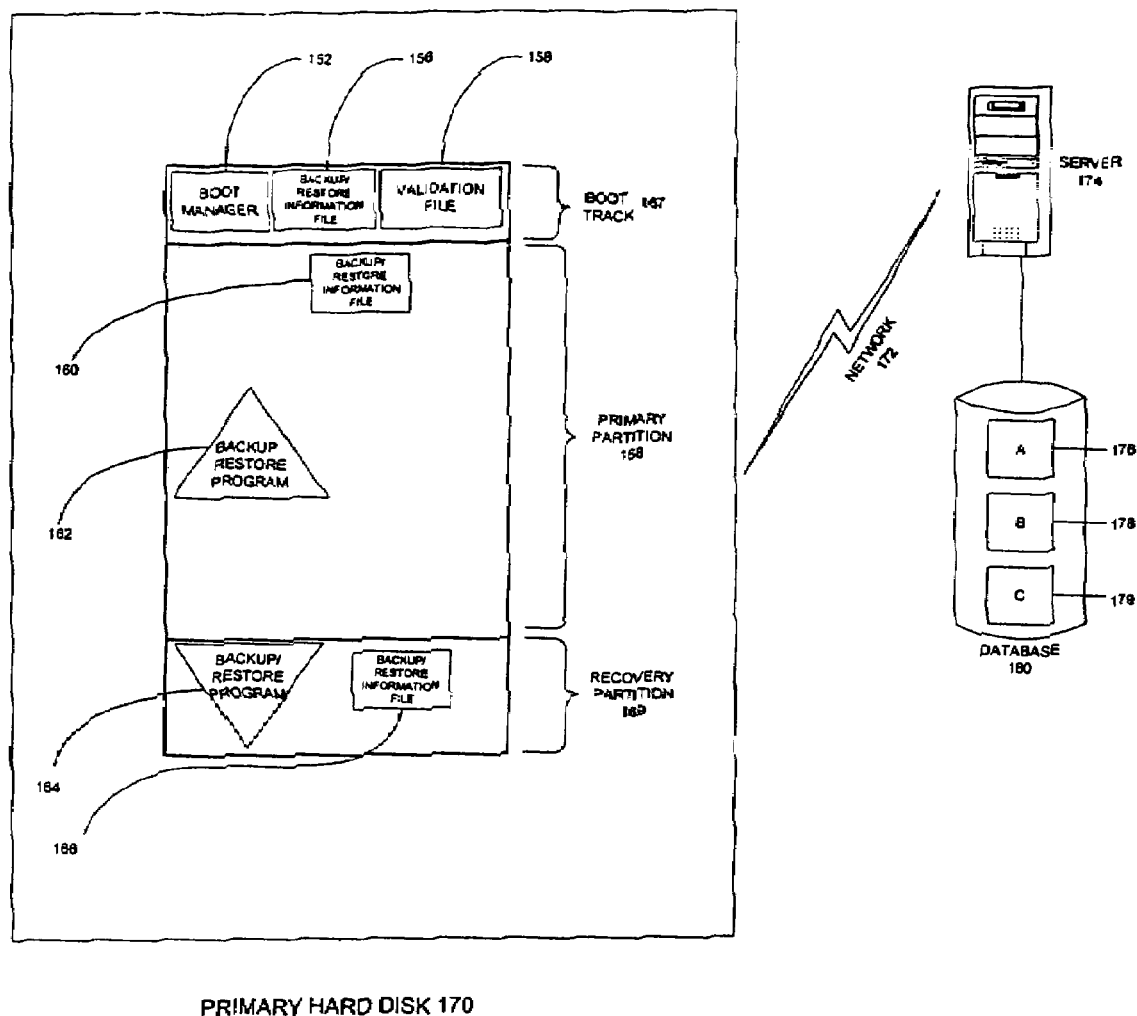
FIG. 4 illustrates a simplified exemplary system embodiment when a network data storage media is used to store backup data in accordance with the present invention.
Figure 5:
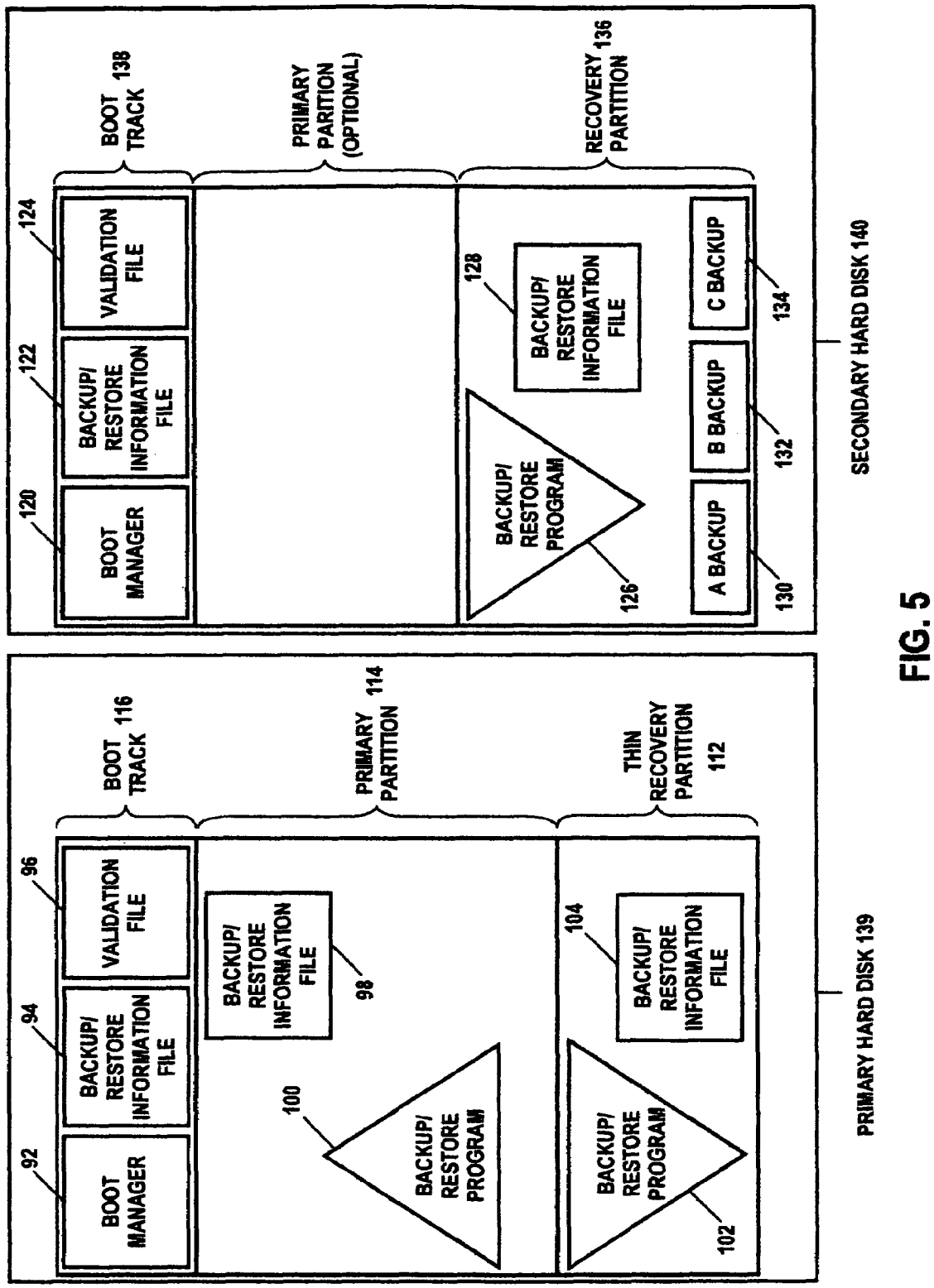
FIG. 5 illustrates a simplified exemplary system embodiment when one data storage media uses a second data storage media for backup purposes in accordance with the present invention.

Furthermore, multiple recovery partitions may be supported spanning multiple conventional storage medias including local hard disks, network storage devices, USB storage devices, etc. FIG. 3, FIG. 4, and FIG. 5 represent additional exemplary system embodiments illustrating a sample of configurations in which the present invention may be included.

FIG. 3 is an exemplary system embodiment of a computer with two hard disks. In the illustrated embodiment, the primary hard disk 139, contains the same elements as discussed in FIG. 2 including a boot track 116, boot manager 92, backup/restore information file 94, and validation file 96. In addition, the primary partition 114 contains a backup/restore information file 98, and a backup/restore program 100. Finally, the recovery partition 112 contains a backup/restore program 102, backup/restore information file 104, A Backup 106, B Backup 108, and C Backup 110.

To ensure backup data redundancy, the backup/restore program copies the entire contents of the primary hard disk's recovery partition 112, including the backup/restore program 102, backup/restore information file 104, A Backup 106, B Backup 108, and C Backup 110 to the secondary hard disk 140, each time a backup is performed from the primary hard disk 139. In addition, the backup/restore program copies the entire contents of the primary hard disk's boot track 116, including the boot manager 92, backup/restore information file 94, and validation file 96, to the secondary hard disk 140, each time a backup is performed from the primary hard disk 139. The result is a recovery partition 136, on the secondary hard disk 140, containing a copy of the backup/restore program 126, backup/restore information file 128, A Backup 130, B Backup 132, and C Backup 134. In addition, the boot track 138, on the secondary hard disk 140, contains a copy of the boot track 138, boot manager 120, backup/restore information file 122, and validation file 124.

The secondary hard disk 140 is used for backup redundancy purposes in the event a physical catastrophe leaves the primary hard disk damaged to the point where it can no longer function properly. Examples of such catastrophes include destroying the hard disk through the use of force (e.g., smashing the hard disk with a hammer) as well as detrimental environmental events such as a fire melting the electro magnetically charged surface(s) comprising the hard disk. In the event the primary hard disk 139 is physically damaged to the point where it is inoperable, the user can promote the secondary hard disk 140, to the primary hard disk channel and restore their disk image using the secondary drive.

FIG. 4 is an exemplary system embodiment of a computer using a single hard disk and a network server. In the illustrated embodiment, the primary hard disk 170, contains the same elements as discussed in FIG. 2 including a boot track 167, boot manager 152, backup/restore information file 156, and validation file 158. In addition, the primary partition 168 contains a backup/restore information file 160, and a backup/restore program 162. Finally, the recovery partition 169 contains a backup/restore program 164, and a backup/restore information file 169. In this configuration, backup data 176, 177, and 178, is transmitted across the network 172, commonly referred to as the LAN, to the server 174, and ultimately stored in the server's database 180. This embodiment differs from the embodiments described in FIG. 2 and FIG. 3 in that the backup data is stored in a location other than the local machine. One of the many benefits arising from this configuration includes protection from the loss of data associated with stolen computers. In the event that a computer is lost or stolen, a computer can be restored using the data stored in the server's database 180.

FIG. 5 is an exemplary system embodiment of a computer with two hard disks. In the illustrated embodiment, the primary hard disk 139, contains the same elements as discussed in FIG. 2 including a boot track 116, boot manager 92, backup/restore information file 94, and validation file 96. In addition, the primary partition 114 contains a backup/restore information file 98, and a backup/restore program 100, in the primary partition as well as a backup/restore information file 98, and a backup/restore program 100, in the recovery partition.

Unlike the exemplary system embodiment illustrated in FIG. 3, the primary hard disk in FIG. 5 does not store backup data in its recovery partition. Rather, primary hard disk's A Backup 106, B Backup 108, and C Backup 110 are stored in the secondary hard disk's recovery partition. In addition to this backup data, the secondary hard disk's recovery partition stores the backup/restore program and backup/restore information file.

Each time a backup is initiated, the backup/restore program copies the entire contents of the primary hard disk's boot track 116, boot manager 92, backup/restore information file 94, and validation file 96 to the secondary hard disk. Optionally, the primary partition on the secondary hard disk can be used to store user data.

FIG. 5 depicts a configuration in which the backup/restore program spans across two data storage medias. This configuration is beneficial for those users with computers that do not have enough free space on their primary hard disk to store backup data. Therefore, the responsibility of storing backup data is offloaded onto a secondary hard disk. The backup on the secondary hard disk is accessible to the backup/restore program on the primary hard disk using similar methods as discussed in the single hard disk configuration (FIG. 2) and redundant disk configuration (FIG. 3). Therefore, the backup/restore program is able to extend its ability to access backup/restore information across multiple partitions as well as multiple operating systems.

Depending on the environment and needs of the end user, one or more configurations discussed in FIG. 2, FIG. 3, and FIG. 4, and FIG. 5 as well as additional configurations not mentioned may be used. Therefore, an end user may configure the backup/restore program to store local backups in the hard disk's recovery partition while simultaneously transmitting data across the network for storage in the server's database. The result is a robust and customizable backup/restore program that can be configured in such a manner that meets the individual business needs of the environment in which it is being used. In addition, end users can customize other aspects of the backup/restore program including, but not limited to, variables such as the number of backups to store in the recovery partition (e.g., A Backup, B Backup, C Backup, etc.) as well as the maximum amount of hard disk space to use for backup purposes.

Figure 6:
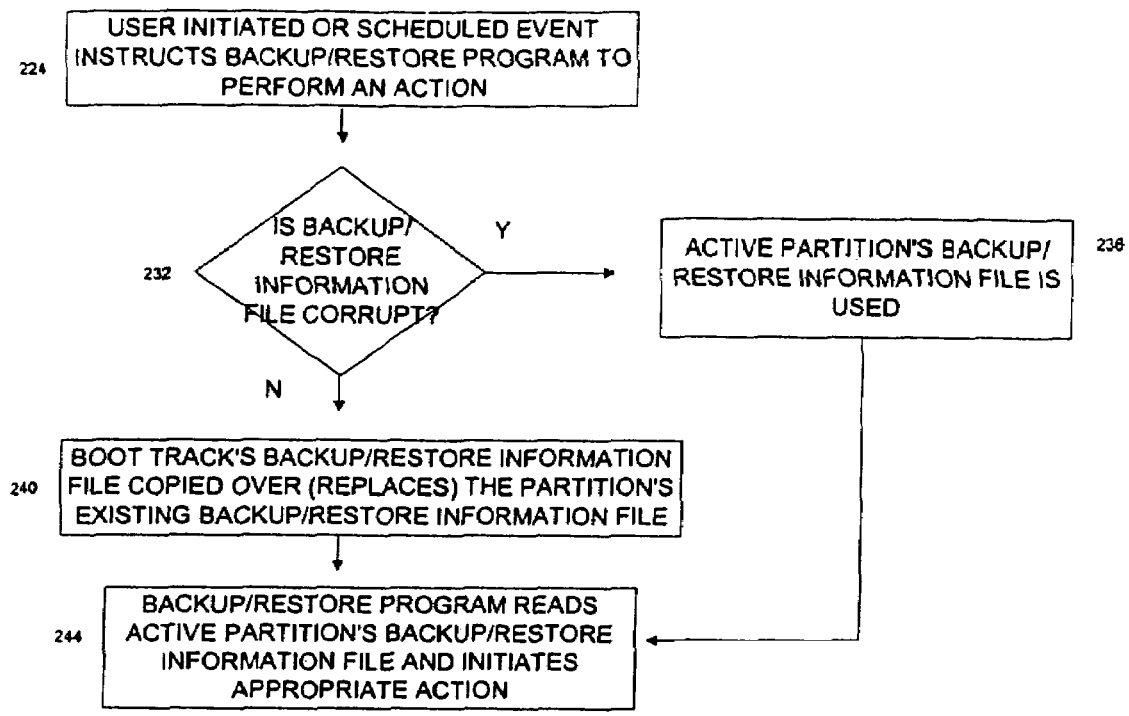
FIG. 6 illustrates a simplified exemplary embodiment of the method whereby the backup/restore information file is obtained from the boot sector with the present invention.

With reference additionally now to FIG. 6, the logical flow of information pertaining to the retrieval of backup-specific information from a hard disk's boot track is discussed. FIG. 6 is based on the single hard disk configuration as illustrated in FIG. 2 and specifically refers to the boot track 86, and the components therein. In addition, the logic used to obtain backup-specific information discussed in FIG. 6 is the same regardless of the configuration in which the backup/restore program is implemented (e.g., single hard disk (FIG. 2.), two hard disks (FIG. 3), remote storage (FIG. 4). In addition, the logic described by FIG. 6 is accurate whether the backup-specific information is requested from a hard disk's primary partition or recovery partition.

Some user initiated or scheduled event instructs the backup/restore program to perform an action, block 224, such as performing a B Backup, modifying the backup schedule, etc. Before performing the specified action, the backup/restore program verifies the backup-specific information stored in the boot track is valid and has not been corrupted since it was last accessed, block 232. Since the boot track is an area on the hard disk that is not designated as belonging to any specific partition, the boot track's backup-specific information is accessible to the backup/restore program within the primary partition as well as the recovery partition, depending on which is the active partition.

For example, if the primary partition is active, the boot track's backup-specific information is available to the primary partition's backup component. Similarly, if the recovery partition is active, the boot track's backup-specific information is available to the recovery partition's backup component. The backup/restore program comprises two components, each residing in a unique partition. Since these components reside in different partitions, neither component is directly aware of the existence of the other. Therefore, the only manner in which the partition-specific components can communicate with each other is via the boot track's backup/restore information file. The boot track's backup/restore information file acts as a gateway in which backup/restore program-specific information is passed between the two partition components.

Backup-specific information includes, but is not limited to, backup/restore program state information such as whether an initial backup exists in the recovery partition and status information such as the last time a backup was performed. In addition, the backup/restore information file contains commands such as "the next time the machine restarts, boot to the recovery partition and restore the primary partition with the A Backup." Command information allows the backup/restore program's primary partition component to instruct the program's recovery partition component to perform specific actions and visa versa. Therefore, the boot track's backup/restore information file ensures the partition-specific components work together to complete tasks that span two unique partitions.

Each time the boot track's backup-specific information is requested, the backup/restore program performs an analysis to verify this information is not corrupt 232. This verification process, block 232, is discussed in detail in FIG. 8. Once the backup/restore program evaluates the backup/restore information file, block 232 and determines the backup-specific information is not corrupt, a copy of the boot track's backup-specific information is transferred into the active partition, replacing the active partition's previous version of the backup-specific information, block 240. The active partition's backup/restore program then uses this backup-specific information to obtain the information necessary to complete the requested task, block 244.

In the event a corruption is detected, the backup/restore program leaves the backup-specific information in the boot track and uses the existing backup-specific information stored in the active partition 236 to obtain the information necessary to complete the requested task, block 244.

Figure 7:
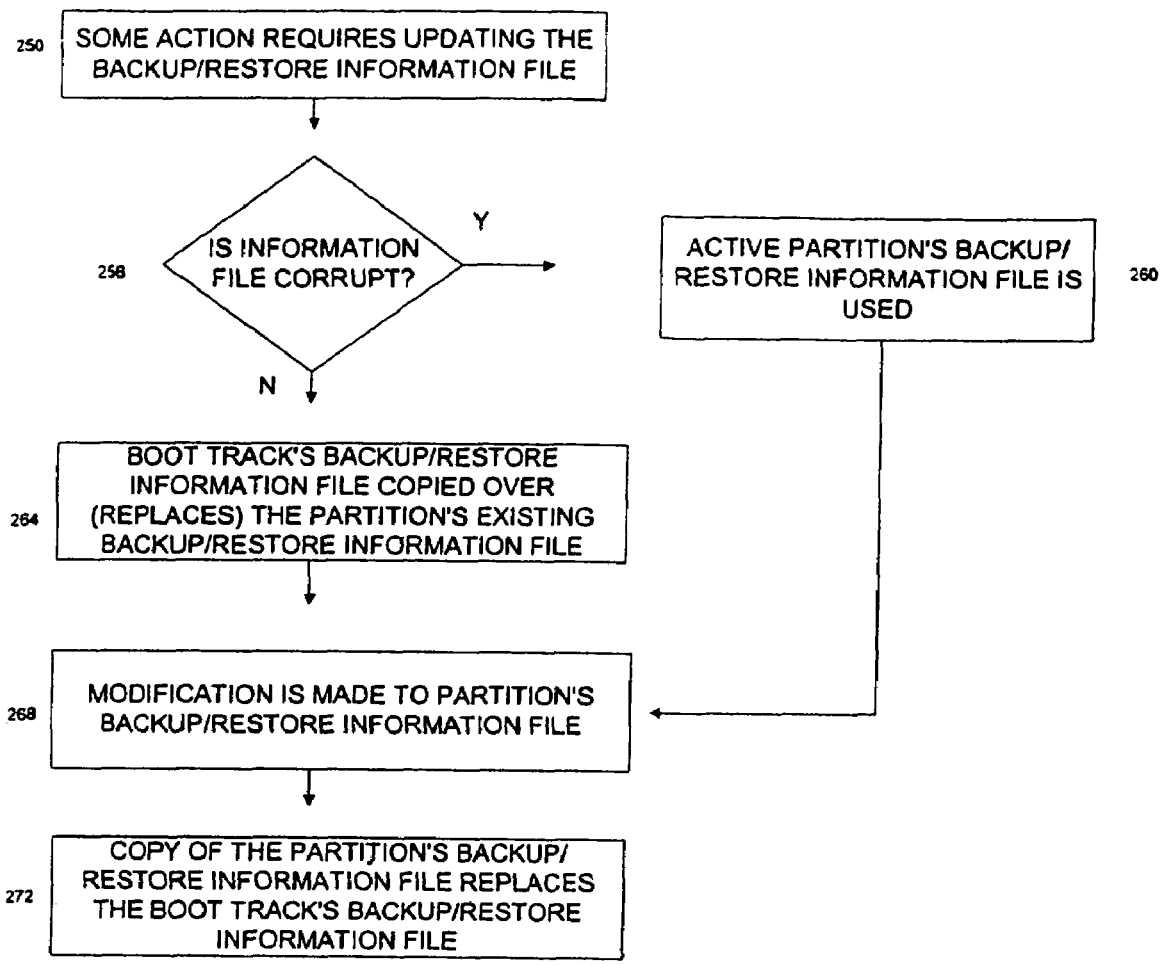
FIG. 7 illustrates a simplified exemplary embodiment of the method whereby the backup/restore information file is updated in the boot sector with the present invention.

With reference additionally now to FIG. 7, a logical flow of information is described in which the boot track's backup-specific information is updated. Some event requiring a modification to the backup/restore information file, such as a change in the backup schedule, causes the backup/restore program to update the boot track's backup/restore information file, block 250. Before updating the boot track's information file, the backup/restore program verifies the backup-specific information stored in the boot track is valid and has not been corrupted since it was last accessed, block 254. The validation process, block 254, is discussed in detail in FIG. 8. If the information within the boot track's backup/restore information file is valid, a copy of the boot track's backup/restore information file is placed in the active partition, replacing the active partition's previous backup/restore information file, block 264. Once the active partition's backup/restore information file is updated, the backup/restore program in the active partition updates its backup/restore information file, block 268, and then copies its updated backup/restore information file back to the boot track, block 272, replacing the boot track's previous backup/restore information file. By copying the updated backup/restore information file back into the boot track, the backup/restore program ensures the inactive partition has access to the most recent backup/restore information file in the event it becomes the active partition at a later point in time. FIG. 6 describes the method by which the active partition obtains this updated backup/restore information file.

In the event a corruption is detected in the boot track's backup/restore information file, the backup/restore program leaves the file in the boot track and uses the existing backup/restore information file stored in the active partition, block 260. Then, the backup/restore program in the active partition updates the active file's backup/restore information file, block 268, and then copies the backup/restore information file back to the boot track, block 272, replacing the boot track's previous backup/restore information file.

Figure 8:
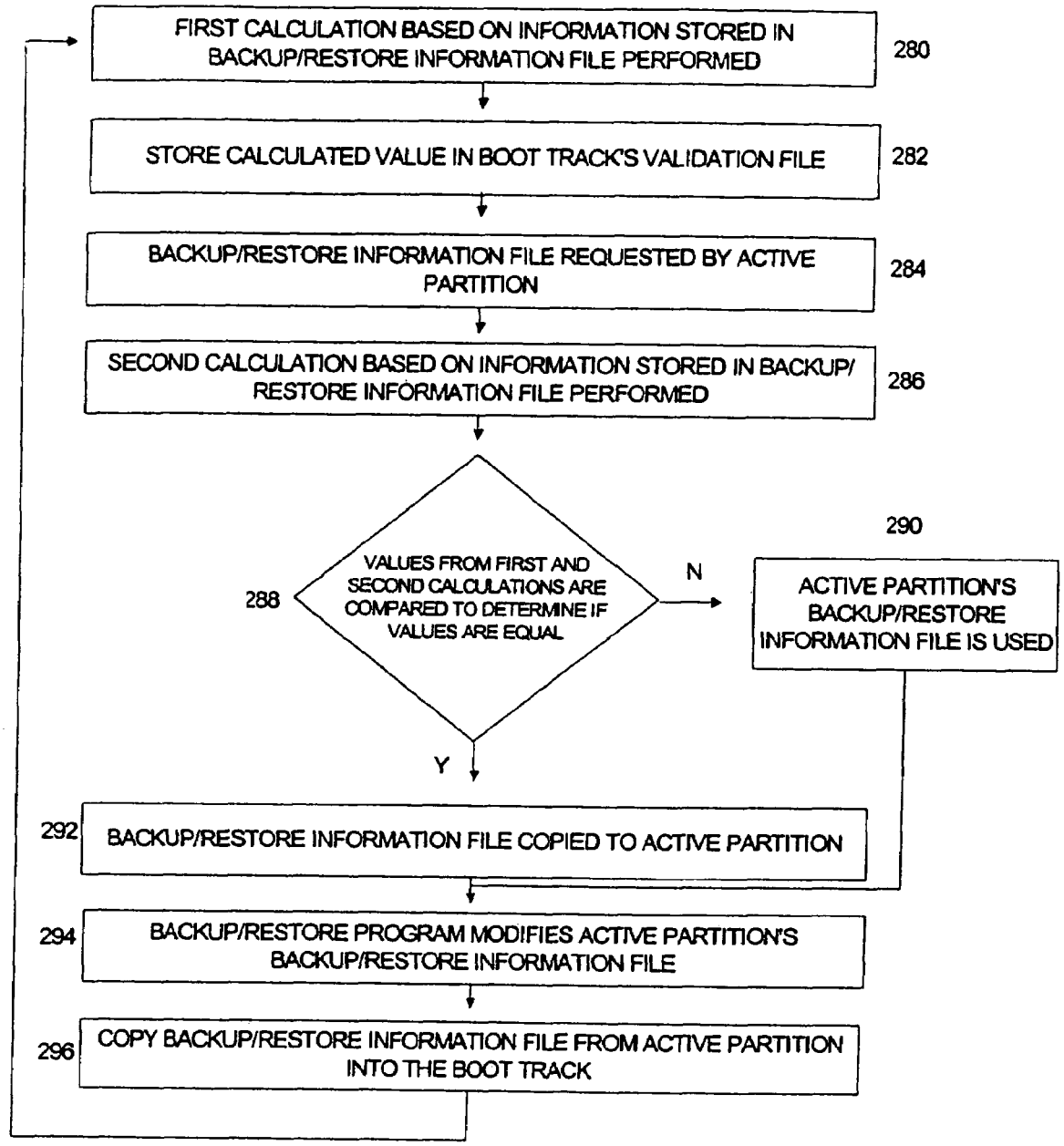
FIG. 8 is a logic flowchart representative of a representative system and method for data integrity verification used in accordance with the present invention.

With reference additionally now to FIG. 8, a logical flow of information is described in which the boot sector's backup/restore information file is verified to ensure the file was not corrupted or modified by an unauthorized process or application since the last time it was accessed. This process involves a typical, well-known, checksum calculation.

Each time the boot track's backup/restore information file is updated, the backup/restore program performs a calculation based on the information stored in the backup/restore information file, block 280, and stores this value in a validation file, block 282. Then, the next time the backup/restore information file is requested by the active partition, block 284, the same calculation based on the information stored in the backup/restore information file is performed a second time, block 286, and this value is compared against the value from the first calculation stored in the validation file, block 288. This checksum verification takes place each time the boot track's backup/restore information file is requested to ensure the file has not been modified since it was last accessed by the backup/restore program. If the values are the same, the boot track's backup/restore information file is not corrupt and the backup/restore information file is copied from the boot track to the active partition, block 292. If, however, the values are not equal, the boot track's file is believed to be corrupt and the backup/restore program uses the active partition's backup/restore information file instead, block 290.

In the event the active partition's backup/restore information file was modified by an authorized program or process, block 294, the backup/restore program copies the active partition's backup/restore information file to the boot track, thereby updating the boot track with the most recent backup/restore information file. Upon updating the boot track's backup/restore information file, block 294, the validation cycle begins again, starting with the recalculation of the value used to represent the validity of the boot track's backup/restore information file, block 280.

In addition, by storing the backup/restore information file in the boot track, the backup/restore program provides a mechanism by which the boot track's backup/restore information file remains undisturbed in the event one or more logical partitions are restored or deleted from the hard disk. Since the boot track is unaffected by changes to logical volumes, the backup/restore information file remains in tact and available to the backup/restore program at all times. This ensures that the backup/restore program's component residing in the active partition is aware of the hard disk's backup state at all times, regardless of whether any or all logical volumes are restored or deleted.

In the preferred embodiment, the backup/restore program consists of two components, each residing in different partitions. Each partition is controlled by its respective operating systems. Therefore, in the event the primary partition is corrupt, the backup/restore program uses its recovery partition to restore the primary partition. Since each partition is unaware of the other partition's existence, the boot sector's backup/restore information file acts as a gateway that passes backup/restore-specific information between the primary and recovery partitions. This flexibility allows the backup component residing in the primary partition to communicate with the backup/restore program residing in the recovery partition component and visa versa. It is this invention that allows the backup/restore program to perform complex processes spanning multiple partitions, operating systems, and possibly storage medias.

Figure 9:
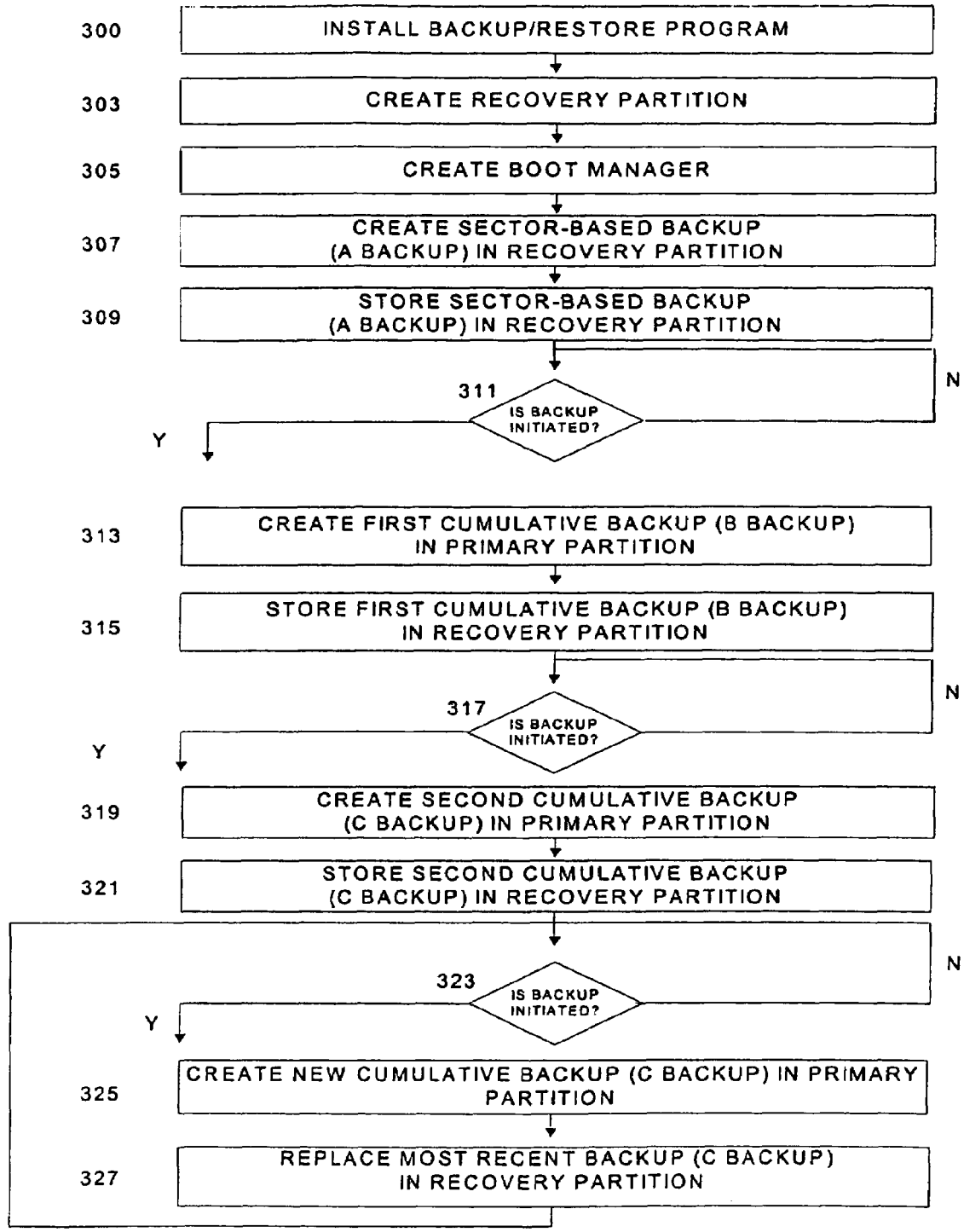
FIG. 9 is a logic flowchart representative of a representative system and method for backing up data when a single data storage media is used in accordance with the present invention.

With reference additionally now to FIG. 9, a logic flowchart representing a system and method for performing backups when a single data storage media is used in accordance with the present invention. Prior to performing any backup/ restore operations, the computer must be configured properly. In the is illustrated embodiment, this process includes installing the backup/restore component within the primary partition, block 300, creating a recovery partition on the storage media, block 303, installing the backup/restore component within the recovery partition, block 304, and creating the boot manager, block 305. Once the above-mentioned processes are completed, the backup/restore program can perform its initial backup. The first backup is a sector-based backup of the primary partition, block 307, generated by the backup/restore component within the recovery partition. This backup, commonly referred to as A Backup, is stored in the recovery partition, block 309.

Then, the backup/restore component within the primary partition waits for the initiation of a backup, block 311. Once the backup is initiated, the backup/restore component within the primary partition generates its first cumulative, file-based backup of the primary partition at that point in time, block 313, and stores this backup in the recovery partition, 315. Then, the backup/restore component within the primary partition waits for the initiation of a backup, block 317. Once the backup is initiated, the backup/restore component within the primary partition generates a second cumulative, file-based backup of the primary partition at that point in time, block 319, and stores this backup in the recovery partition, block 321. Again, the backup/restore component within the primary partition waits for the initiation of a backup, block 323. Once the backup is initiated, the backup/restore component within the primary partition generates a third cumulative, file-based backup representing the primary partition at that point in time, block 325, and replaces the second cumulative backup with the more recent third backup, block 327. All future backups follow the same process as the fourth file-based backup replaces the third; the fifth file-based backup replaces the fourth; the sixth file-based backup replaces the fifth; etc.

The result of the backup process in the preferred embodiment is a combination of a sector-based backup created from within the recovery partition and multiple file-based backups created from within the primary partition. While not included in FIG. 9, each time a backup is performed, the boot sector's backup/restore information file is accessed, verified, and updated as illustrated in FIG. 6, FIG. 8, and FIG. 7, respectively. This ensures the primary and recovery backup/restore components have access to the most recent backup/restore information.

Figure 10:
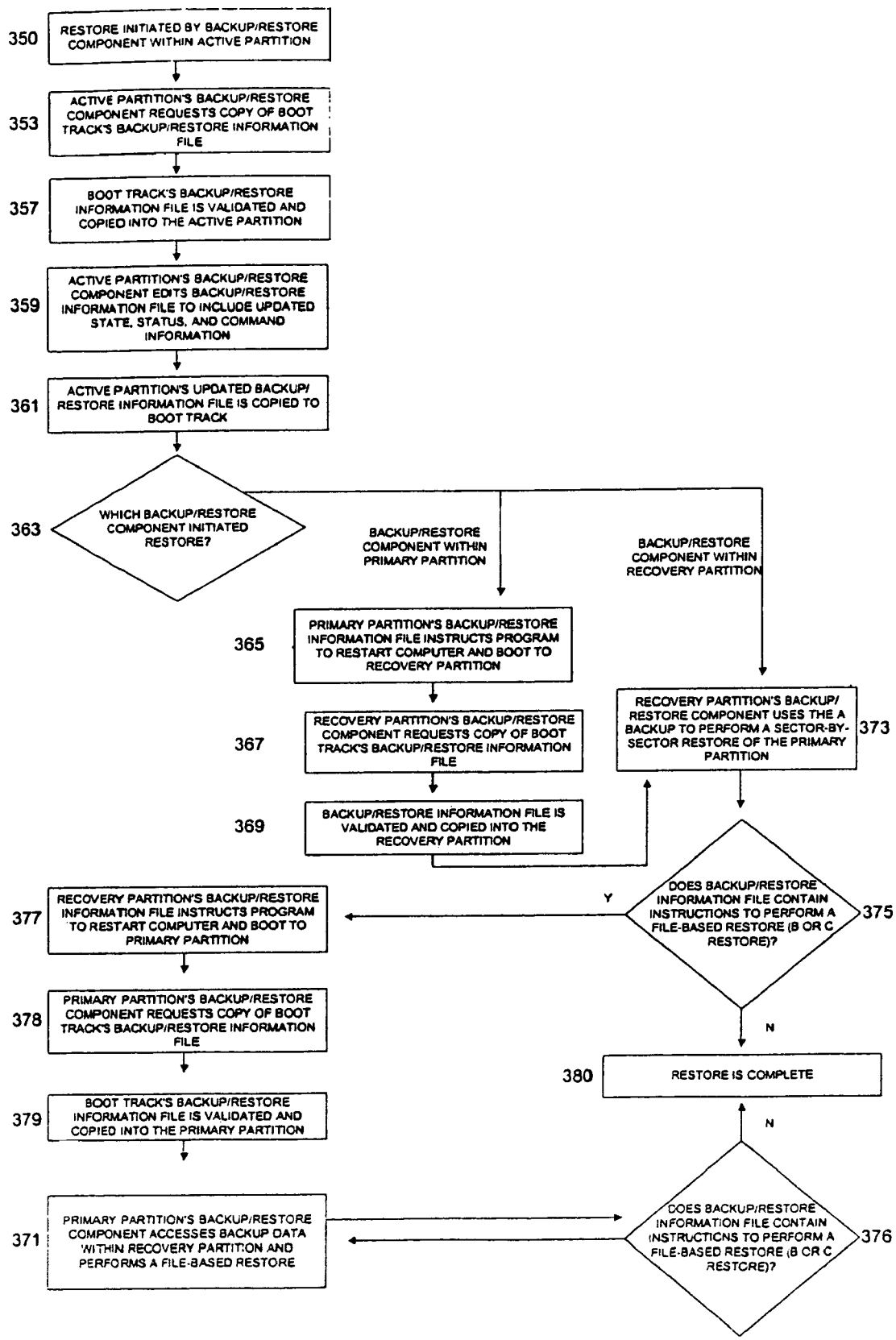
FIG. 10 is a logic flowchart representative of a representative system and method for restoring data when a single data storage media is used in accordance with the present invention.

With reference additionally now to FIG. 10, a logic flowchart representing a system and method for performing a sector-based restore when a single data storage media is used in accordance with the present invention. FIG. 10 also includes a logical representation of requesting a cumulative backup that requires a sector-based restore followed by one or more file-based restores. In the illustrated embodiment, this process includes initiating a restore from the active partition's backup/restore component, block 350. Then, the active partition's backup/restore component requests a copy of the boot track's backup/restore information file, block 353. Once validated, the boot track's backup/restore information file is copied into the active partition, block 357. The active partition's backup/restore component modifies its backup/restore information file to include updated program information including state, status, and command information, block 359, and then copies the updated backup/restore information file back into the boot track, block 361. This process ensures the boot track's backup/restore information file contains the most recent information including commands such as "reboot machine then perform a sector-based restore (A backup) then perform a file-based restore (B backup)."

The next step depends on the active partition initiating the restore, block 363. If the restore is initiated from the backup/restore component within the recovery partition, the recovery partition's backup/restore program uses the sector-based backup (A Backup) to perform a sector-by-sector restore of the primary partition, block 373. Then, the recovery partition's backup/restore component determines if its backup/restore information file includes instructions to perform a file-based restore (B Backup or C Backup), block 375. If a file-based restore is not required, the restore process is complete, block 380. If, however, a file-based restore is required, the recovery partition's backup/restore information file instructs the backup/restore component to restart the machine and boot to the primary partition, block 377. Upon rebooting, the primary partition's backup/restore component requests a copy of the boot track's backup/restore information file, block 378, which contains the most recent backup/restore status, state, and command information. Once validated, the boot track's backup/restore information file is copied into the primary partition, block 379. Then, the primary partition's backup/restore component reads its backup/restore information file, instructing the program to access the backup data within the recovery partition and perform a file-based restore, block 371. The primary partition's backup/restore component edits its backup/restore information file indicating the file-based restore has been initiated and then copies this back to the book track (not shown in the flow chart). Then, the primary partition reads its backup/restore information file again to determine if an additional file-based restore is required, block 376. If no additional restores are required, the restore process is completed, block 380. If an additional file-based restore is required, the primary partition's backup/restore program repeats the process of accessing the backup data within the recovery partition to perform a file-based restore, block 371. Again, the primary partition reads its backup/restore information file to determine if an additional file-based restore is required, block 376. When all file-based backups have been restored, the restore process is completed, block 380.

The following description provides a logical flow of information in the event a restore is initiated from the backup/restore component within the primary partition. When the restore is initiated, the primary partition's backup/restore information files instructs the backup/restore program to restart the computer and boot to the recovery partition, block 365. Upon rebooting, the recovery partition's backup/restore component requests a copy of the boot track's backup/restore information file, block 367, which contained the most recent backup/restore status, state, and command information. Once validated, the boot track's backup/restore information file is copied into the recovery partition, block 369. Then, the protected partition's backup/restore component reads its backup/restore information file, instructing the program to access the backup data within the recovery partition and perform a sector-based restore of the primary partition, block 373. The recovery partition's backup/restore component edits its backup/restore information file and then copies this back to the boot track (not shown in the flow chart). Upon completing the sector-based restore, the recovery partition reads its backup/restore information file again to determine if an additional file-based restore is required, block 375. If no additional restores are required, the restore process is completed, block 380. If an additional file-based restore is required, the recovery partition's backup/restore program instructs the machine to restart and boot the primary partition, block 377.

Upon rebooting, the primary partition's backup/restore component requests a copy of the boot track's backup/restore information file, block 378, which contains the most recent backup/restore status, state and command information. Once validated, the boot track's backup/restore information file is copied into the primary partition, block 379. Then, the primary partition's backup/restore component reads its backup/restore information file, instructing the program to access the backup data within the recovery partition and perform a file-based restore, block 371. The primary partition's backup/restore component edits its backup/restore information file and then copies this back to the boot track (not shown in the flow chart). The, the primary partition reads its backup/restore information file again to determine if an additional file-based restore is required, block 376. If no additional restores are required, the primary partition's backup/restore program repeats the process of accessing the backup data within the recovery partition to perform a file-based restore, block 371, editing the primary partition's backup/restore information file, and copying it back to the boot track (not shown in the flow chart). Again, the primary partition reads its backup/restore information file to determine if an additional file-based restore is required, block 376. When all file-based backups have been restored, the restore process is completed, block 380.

Figure 11:
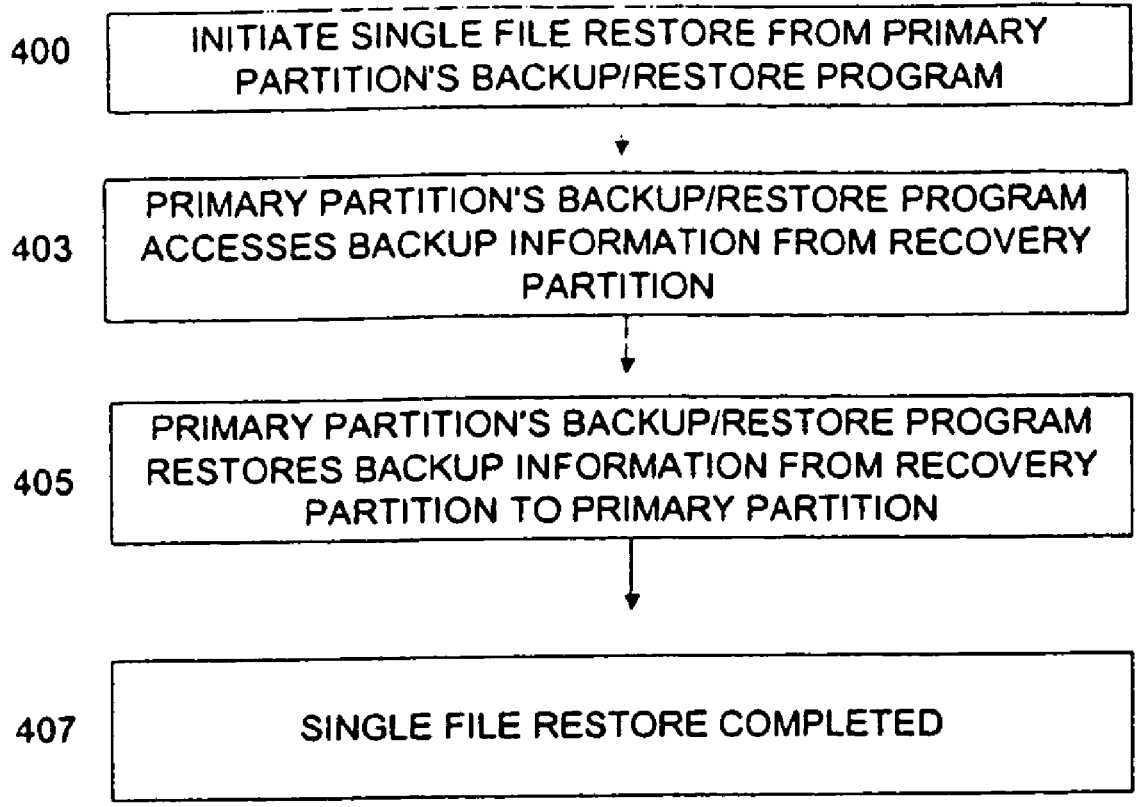
FIG. 11 is a logic flowchart representative of a representative system and method for restoring a single file from a file-based backup when a single data storage media is used in accordance with the present invention.

With reference additionally now to FIG. 11, a logic flowchart representing a system and method for performing a single file-based restore when a single data storage media is used in accordance with the present invention. A single file restore is the process of restoring one file from a file-based backup within the recovery partition. This allows users the flexibility to recover from the loss or corruption of a specific file without requiring the restoration of the entire primary partition. In the illustrated embodiment, this process includes initiating a restore from the primary partition's backup/restore component, block 400. Then, the primary partition's backup/restore component accesses the specified file-based backup (B backup or C backup), block 403. Finally, the primary partition's backup/restore program restores the selected files from the recovery partition to the specified location in the primary partition, block 405, to complete the single-file restore, block 407.

The term "primary partition" as used in the appended claims is intended to mean all of the area of disk storage in which the primary operating system executes application programs—more specifically, all disk storage except the boot track and the protected area in which the recovery partition's operating system functions. The primary operating system may actually span two or more partitions all of which comprise the "primary partition" as used in the claims.

The instant invention has been shown and described herein in what is considered to be the most practical and preferred embodiment. It is recognized, however, that departures may be made there from within the scope of the invention and that obvious modification will occur to a person skilled in the art. It is intended that the claims herein cover all such departures and obvious modifications.

What is claimed is:

1. An article of manufacture stored on a computer-readable storage medium which recovers from corruption of a primary operating system in a system in which a primary operating system and user data are stored in a first storage area, the article of manufacture performing the steps of:
    (a) creating and storing, in a second storage area, a sector-by-sector copy of the first storage area including user data after the primary operating system has been installed;
    (b) using the primary operating system to install a second operating system in a protected storage area outside of the first storage area, the protected storage area being hidden from users; and
    (c) in the event of corruption of the primary operating system, restoring the first storage area including user data under the control of the second operating system using the sector-by-sector copy stored in the second storage area.

2. An article of manufacture stored on a computer-readable storage medium which recovers from corruption of a primary operating system in a system in which a primary operating system is stored in a first storage area, the article of manufacture performing the steps of:
    (a) creating and storing, in a second storage area, a sector-by-sector copy of the first storage area including user data after the primary operating system has been installed; and
    (b) in the event of corruption of the primary operating system, restoring the first storage area including user data under the control of the second operating system using the sector-by-sector copy stored in the second storage area, wherein the article of manufacture includes the step of using the primary operating system to install the second operating system in a protected storage area hidden from users.

3. A computer-implemented method of recovering from corruption of a primary operating system in a system in which the primary operating system and user data are stored in a first storage area, comprising the steps of:
    (a) creating and storing, in a second storage area, a sector-by-sector copy of the first storage area including user data after the primary operating system has been installed; and
    (b) in the event of corruption of the primary operating system, restoring the first storage area including user data under the control of a second operating system using the sector-by-sector copy stored in the second storage area, wherein the method includes the step of using the primary operating system to install the second operating system in a protected storage area hidden from users.

4. An apparatus comprising:
    (a) a first storage area which stores a first operating system and user data, said first operating system for operating the apparatus before and after a restoring of the first storage area;
    (b) a second storage area which is coupled to the first storage area and stores a recovery operating system and a first sector-by-sector copy of the first storage area including the primary operating system and user data which is added after the primary operating system is stored;
    (c) a second copy of the first storage area which comprises changed content of the first storage area after the first copy was made, said copy stored in a storage area of the apparatus; and
    (d) the recovery operating system which restores the first storage area using at least one of the first copy and the second copy.

5. The data processing apparatus of claim 4, wherein the first storage area and the area outside the first storage area are contained in a single storage device.

6. The data processing apparatus of claim 4, wherein the first storage area is contained in a first storage device and the second storage area is contained in a second storage device different from the first storage device and a coupling between the first and second storage devices uses at least one of a USB bus, I/O bus, local area network and wide area network.

7. A computer-implemented method of recovering a system in which a primary operating system and user data are stored in a first storage area of the system, the method comprising the steps of:
   (a) creating a backup/restore information file and storing it in an area outside the first storage area for establishing communication between the primary operating system and a recovery operating system;
   (b) creating a first copy of the first storage area and storing the first copy outside of the first storage area;
   (c) creating a second copy of the first storage area and storing the second copy in an area outside of the first storage area, said second copy comprising the changed content of the first storage area including user data since the first copy was made; and
   (d) restoring the first storage area from at least one of the first copy and the second copy using the backup/restore information file and at least one of the primary operating system and the recovery operating systems.

8. The computer-implemented method of claim 7 wherein the step of creating the first copy includes sector-by-sector copying.

9. The computer-implemented method of claim 7 wherein the step of restoring the first storage area from the at least one of the first copy and the second copy includes the step of restoring the first storage area using less than all of the portions chosen from the first and the second copy.

10. The computer-implemented method of claim 7 wherein the step of creating the first copy includes the step of using the primary operating system to create the first copy.

11. The computer-implemented method of claim 7, wherein the step of storing the first copy of the first storage area in the storage area outside the first storage area includes storing on one storage device which contains the recovery operating system and the step of restoring the first storage area includes the step of using the one storage device and the recovery operating system.

12. The computer-implemented method of claim 7, wherein the first storage area is located in a first storage device, the step of storing the first copy of the first storage area includes storing it in a second storage device different from the first storage device, and the method includes coupling the first and second storage devices using at least one of a USB bus, I/O bus, local area network and wide area network.

13. The computer-implemented method of claim 7 including the steps of storing the first copy in a first storage device, storing the second copy in a second storage device different from the first storage device and coupling the first and second storage devices using at least one of a USB bus, I/O bus, local area network and wide area network.

14. A data processing apparatus comprising:
   (a) a first storage area which stores a first operating system and user data and, said first operating system operating the apparatus before and after a restoring of the first storage area;
   (b) an area outside of the first storage area which stores a first copy of the first storage area including user data after the first operating system has been installed, said copy created by the first operating system and a second copy of the first storage area, said second copy comprising content of the first storage area changed since the first copy was made;
   (c) a backup and restore information file stored in an area outside the first storage area and establishing communication between the first operating system and a recovery operating system; and
   (d) the recovery operating system stored in the area outside the first storage area; said recovery operating system restoring the first storage area using at least one of the first copy and the second copy and the backup and restore information file.

15. The data processing apparatus of claim 14, wherein the first storage area and the area outside the first storage area are contained in a single storage device.

16. The data processing apparatus of claim 14, wherein the first storage area is contained in a first storage device and the second storage area is contained in a second storage device different from the first storage device and the apparatus includes a coupling between the first and second storage devices using at least one of a USB bus, I/O bus, local area network and wide area network.

17. A data processing apparatus comprising:
   (a) a first storage area which stores a first operating system and user data;
   (b) a second storage area which stores a first sector-by-sector copy of the first storage area including user data after the first operating system has been installed, said copy was created by the first operating system and a second copy of the first storage area, said second copy comprising changed content of the first storage area since the first copy was made; and
   (c) a third storage area which stores at least one of the first copy and the second copy using a second operating system and operates using a third operating system within the restored copy which is different from the second operating system.

18. The data processing apparatus of claim 17, wherein the first storage area and the second storage area are contained in a single storage device.

19. The data processing apparatus of claim 17, wherein the first storage area is contained in a first storage device and the second storage area is contained in a second storage device different from the first storage device and the apparatus includes a coupling between the first and second storage devices which uses at least one of a USB bus, I/O bus, local area network and wide area network.

20. An article of manufacture stored on a computer-readable storage medium which recovers a system in which a primary operating system and user data are stored in a first storage area of the system, the article of manufacture performing the steps of:
   (a) creating a backup/restore information file and storing it in an area outside the first storage area for establishing communication between the primary operating system and a recovery operating system;
   (b) creating a first copy of the first storage area and storing the first copy outside of the first storage area;
   (c) creating a second copy of the first storage area and storing the second copy in an area outside of the first storage area said second copy comprises changed content of the first storage area including user data since the first copy was made; and
   (d) restoring the first storage area from at least one of the first copy and the second copy using the backup/restore information file and at least one of the primary operating system and the recovery operating system.

21. The article of manufacture of claim 20 wherein the step of restoring the first storage area from the at least one of the first copy and the second copy includes restoring less than all of the portions in one of the first and the second copy.

22. The article of manufacture of claim 20 wherein the step of creating the first copy of the first storage area includes sector-by-sector copying.

23. The article of manufacture of claim 20 wherein the step of creating the first copy includes the step of using the primary operating system to create the first copy.

24. The article of manufacture of claim 20, wherein the article of manufacture performs the step of storing first storage area, the storage area outside the first storage area, and the recovery operating system on one storage device and the step of restoring the first storage area includes the step of using the one storage device and the second operating system.

25. The article of manufacture of claim 20, wherein the article of manufacture performs the steps of containing first storage area in a first storage device, containing the area outside the first storage area in a second storage device different from the first storage device, and coupling the first and second storage devices using at least one of a USB bus, I/O bus, local area network and wide area network.

26. The article of manufacture of claim 20, wherein the article of manufacture performs the steps of storing the first copy in a first storage device storing the second copy in a second storage device different from the first storage device, and coupling the first and second storage devices using at least one of a USB bus, I/O bus, local area network and wide area network.

* * * * *

UNITED STATES PATENT AND TRADEMARK OFFICE
CERTIFICATE OF CORRECTION

| | |
|---|---|
| PATENT NO. | : 7,689,861 B1 |
| APPLICATION NO. | : 12/286202 |
| DATED | : March 30, 2010 |
| INVENTOR(S) | : Frank C. Wang et al. |

Page 1 of 1

It is certified that error appears in the above-identified patent and that said Letters Patent is hereby corrected as shown below:

At column 14, line 21, change "the second operating system" to read -- a second operating system --.

Signed and Sealed this

First Day of June, 2010

David J. Kappos
*Director of the United States Patent and Trademark Office*